US008019314B2

(12) United States Patent
Tomiyama

(10) Patent No.: US 8,019,314 B2
(45) Date of Patent: Sep. 13, 2011

(54) RADIO COMMUNICATION APPARATUS

(75) Inventor: Hitoshi Tomiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 12/137,091

(22) Filed: Jun. 11, 2008

(65) Prior Publication Data

US 2009/0004992 A1    Jan. 1, 2009

(30) Foreign Application Priority Data

Jun. 26, 2007  (JP) .................................. 2007-167376

(51) Int. Cl.
*H04B 1/26* (2006.01)
(52) U.S. Cl. ........ 455/323; 455/325; 455/333; 455/324; 455/305; 455/306; 327/359
(58) Field of Classification Search .................. 455/323, 455/325, 333, 324, 305, 306; 327/359
See application file for complete search history.

(56) References Cited

U.S. PATENT DOCUMENTS

| 6,194,947 | B1 * | 2/2001 | Lee et al. ....................... 327/359 |
| 7,260,418 | B2 * | 8/2007 | Natarajan et al. ............ 455/562.1 |
| 7,302,011 | B1 * | 11/2007 | Granger-Jones .............. 375/302 |
| 7,502,631 | B2 | 3/2009 | Hashemi et al. |
| 7,756,472 | B2 * | 7/2010 | Darabi et al. ..................... 455/20 |

FOREIGN PATENT DOCUMENTS

| JP | 2005-094178 | 4/2005 |
| JP | 2006-229619 | 8/2006 |
| JP | 2006-237711 | 9/2006 |
| JP | 2006-246323 | 9/2006 |
| JP | 2006-287900 | 10/2006 |
| JP | 2007-515104 | 6/2007 |

OTHER PUBLICATIONS

Masahisa Tamura et al.; A Fully Integrated Inter-Stage-Bandpass-Filter-Less Direct-Conversion Receiver for W-CDMA; 2005; IEEE Radio Frequency Integrated Circuits Symposium.
Japanese Office Action issued on Apr. 28, 2009 corresponding to JP Application No. 2007-167376.

* cited by examiner

*Primary Examiner* — Sanh Phu
(74) *Attorney, Agent, or Firm* — SNR Denton US LLP

(57) ABSTRACT

A radio communication apparatus using a direct conversion method capable of receiving a radio signal having a predetermined frequency band. The radio communication apparatus includes: a low-noise amplifier section including one or a plurality of low-noise amplifiers receiving input of a receiving signal having a predetermined frequency band; and a mixer section including in-phase and quadrature mixers demodulating an output of the low-noise amplifier into in-phase-component and quadrature-component signals, respectively, wherein the mixer section includes a capacitor in an input section, separates the in-phase component and the quadrature component by the capacitor, and supplies the components to the corresponding in-phase and quadrature mixers, respectively.

8 Claims, 6 Drawing Sheets

FIG. 1

| OPERATING BAND | UL FREQUENCIES UE TRANSMIT, NODE B RECEIVE | DL FREQUENCIES UE RECEIVE, NODE B TRANSMIT |
|---|---|---|
| I | 1920 - 1980 MHz | 2110 - 2170 MHz |
| II | 1850 - 1910 MHz | 1930 - 1990 MHz |
| III | 1710 - 1785 MHz | 1805 - 1880 MHz |
| IV | 1710 - 1755 MHz | 2110 - 2155 MHz |
| V | 824 - 849 MHz | 869 - 894 MHz |
| VI | 830 - 840 MHz | 875 - 885 MHz |
| VII | 2500 - 2570 MHz | 2620 - 2690 MHz |
| VIII | 880 - 915 MHz | 925 - 960 MHz |
| IX | 1749.9 - 1784.9 MHz | 1844.9 - 1879.9 MHz |
| X | 1710 - 1770 MHz | 2110 - 2170 MHz |

RADIO COMMUNICATION APPARATUS

CROSS REFERENCES TO RELATED APPLICATIONS

The present invention contains subject matter related to Japanese Patent Application JP 2007-167376 filed in the Japanese Patent Office on Jun. 26, 2007, the entire contents of which are incorporated herein by reference.

BACKGROUND OF THE INVENTION

1. Field of the Invention

The present invention relates to a multiband radio technique using a plurality of radio frequency (RF) bands in a radio communication system, such as a cellular phone, a wireless LAN (WLAN), and the like. More particularly, the present invention relates to a radio communication apparatus which can be adapted to a plurality of RF bands.

2. Description of the Related Art

In recent years, an increase in the number of users of cellular phones has made it difficult to accommodate new users only in the frequency bands allocated for the third-generation cellular phones at first.

In order to solve this problem, it is necessary to develop a mobile terminal corresponding to a plurality of frequency bands, which are produced, for example, by allocation of a new frequency band, replacement of frequency bands that have been allocated to the second-generation, and the like.

As shown in FIG. 1, 3GPP, which has produced the specifications of the third-generation cellular phones, defines ten frequency bands between the band I and the band X.

In general, in the receiving section of a mobile telephone terminal, a direct conversion method is used, because the receiver using that method can be implemented with a fewer number of parts than the receiver using a superheterodyne method (for example, refer to Japanese Unexamined Patent Application Publication No. 2006-246323).

FIG. 2 is a diagram illustrating an example of a configuration of a communication apparatus having a receiving system of a cellular phone using a direct conversion method.

As shown in FIG. 2, the communication apparatus 1 has an antenna (ANT) 2, a switch (SW) 3, a duplexer (DUP) 4, a transmission power amplifier (PA) 5, a low-noise amplifier (LNA) 6, a filter 7, a local oscillator (LO) 8, a divider (phase shifter) 9, mixers (MIX) 10I and 10Q, low-path filters (LPF) 11I and 11Q, and a baseband circuit 12.

In the communication apparatus 1, an RF signal received by the antenna 2 is demodulated through the switch 3, the duplexer 4, the LNA 6, the filter 7, the mixers 10I and 10Q, the LPFs 11I and 11Q, and the baseband circuit 12.

Here, in FIG. 2, the LNA 6, the filter 7, and the mixers 10I and 10Q, which are surrounded by a broken line, are requested to have a different frequency characteristic depending on each receiving frequency.

SUMMARY OF THE INVENTION

In FIG. 2, although the LNA 6, the filter 7, and the mixers 10I and 10Q, which are surrounded by a broken line, are requested to have a different frequency characteristic depending on each receiving frequency, the filter 7 used here is requested to process a high frequency and to have a sharp attenuation characteristic, and thus it is difficult to achieve this function by an IC internal circuit.

As a result, in order to process a plurality of receiving frequencies, it is necessary for a mobile telephone terminal to include a plurality of filter parts in addition to an IC, and thus it is not appropriate for miniaturization of the mobile telephone terminal.

It is desirable to provide a radio communication apparatus which can dispense with filter parts, can prevent an increase in the number of parts in the case of having a multiband capability, can be miniaturized, and can achieve receiving processing with high precision.

According to an embodiment of the present invention, there is provided a radio communication apparatus using a direct conversion method capable of receiving a radio signal having a predetermined frequency band, the radio communication apparatus including: a low-noise amplifier section including one or a plurality of low-noise amplifiers receiving input of a receiving signal having a predetermined frequency band; and a mixer section including in-phase and quadrature mixers demodulating an output of the low-noise amplifier into in-phase-component and quadrature-component signals, respectively, wherein the mixer section includes a capacitor in an input section, separates the in-phase component and the quadrature component in direct current by the capacitor, and supplies the components to the corresponding in-phase and quadrature mixers, respectively.

In the embodiment of the present invention, the low-noise amplifier section preferably includes a bias circuit generating a bias signal biassing a signal-input terminal of the low-noise amplifier; and a filter reducing noise of an output signal of the bias circuit and supplying the signal to the signal-input terminal.

In the embodiment of the present invention, each of the plurality of low-noise amplifiers is preferably formed by a differential pair of transistors, and each of the differential pairs of transistors has a differential inductor for degeneration in common at a reference potential side.

Also, in the embodiment of the present invention, each of the plurality of low-noise amplifiers is preferably formed by a differential pair of transistors, and each of the differential pairs of transistors has cascode-connected transistors and a load inductor in common at an output side.

In the embodiment of the present invention, the low-noise amplifier section preferably has a switch selectively supplying the bias signal through the filter to input of the low-noise amplifier corresponding to input of the frequency signal in response to a receiving frequency.

In the embodiment of the present invention, the in-phase and quadrature mixers are preferably formed individually by a Gilbert cell mixer including a differential pair of transistors, and the input section of the mixer section supplies an output signal of the low-noise amplifier section to a differential connection section of the transistors of the corresponding cell through a capacitor.

By the present invention, a signal having been subjected to the amplification operation by a predetermined low-noise amplifier of the low-noise amplifier section is directly input into the mixer section.

The mixer section includes a capacitor in an input section, separates an in-phase component and a quadrature component in direct current by the capacitor, and supplies the components to the corresponding in-phase mixer and quadrature mixer, respectively.

By the present invention, it is possible to provide a radio communication apparatus which can make filter parts unnecessary, can prevent an increase in the number of parts in the case of having a multiband capability, can be miniaturized, and can achieve receiving processing with high precision.

BRIEF DESCRIPTION OF THE DRAWINGS

FIG. 1 is a diagram illustrating a list of transmission and receiving frequencies for third-generation cellular phones;

DESCRIPTION OF THE PREFERRED EMBODIMENTS

In the following, a description will be given of embodiments of the present invention with reference to drawings.

Figure 2:
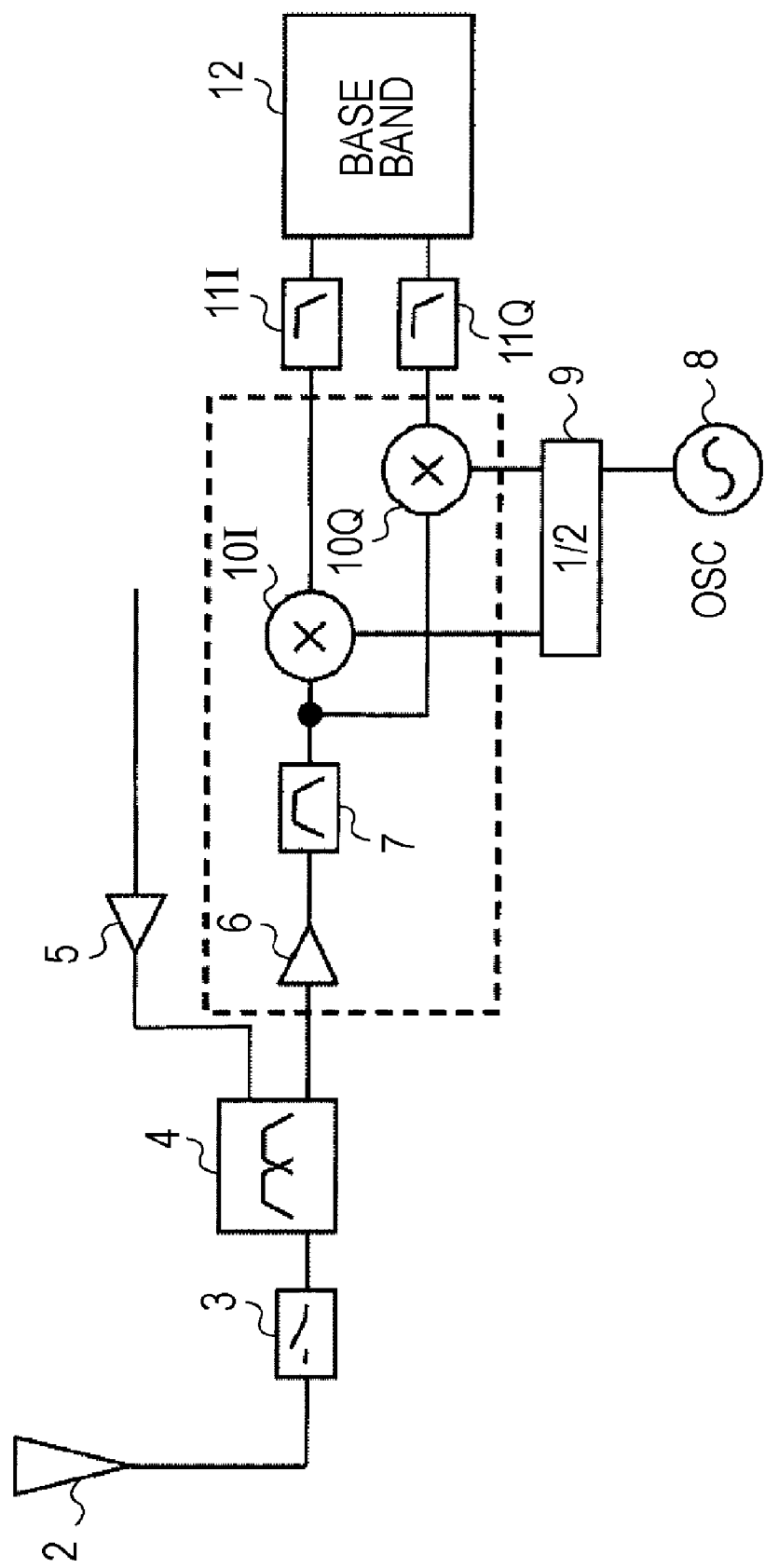
FIG. 2 is a diagram illustrating an example of a configuration of a communication apparatus, primarily on a receiving system, of a cellular phone using a direct conversion method.
Figure 3:
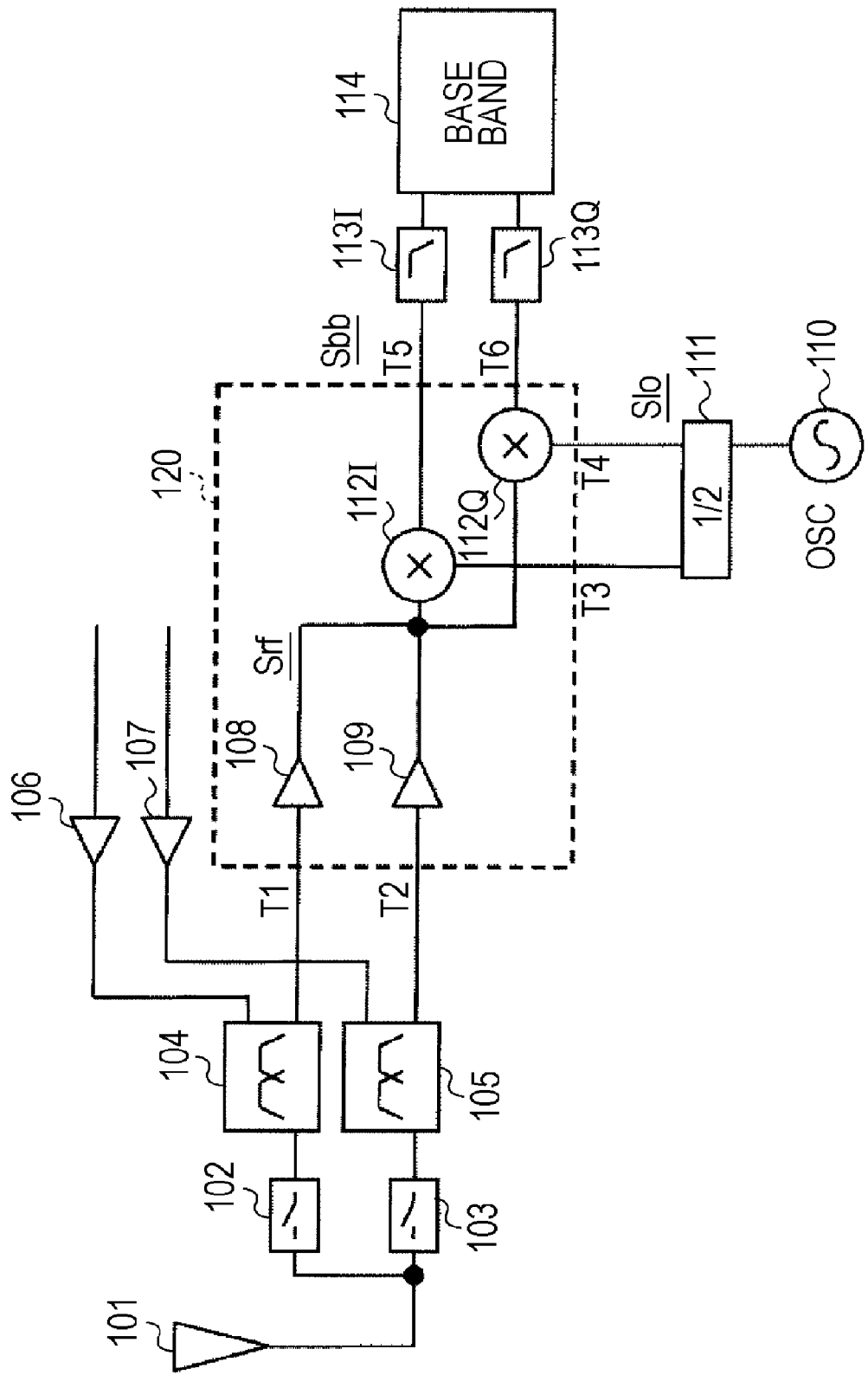
FIG. 3 is a diagram illustrating an example of a configuration of a radio communication apparatus according to an embodiment of the present invention.
Figure 4:
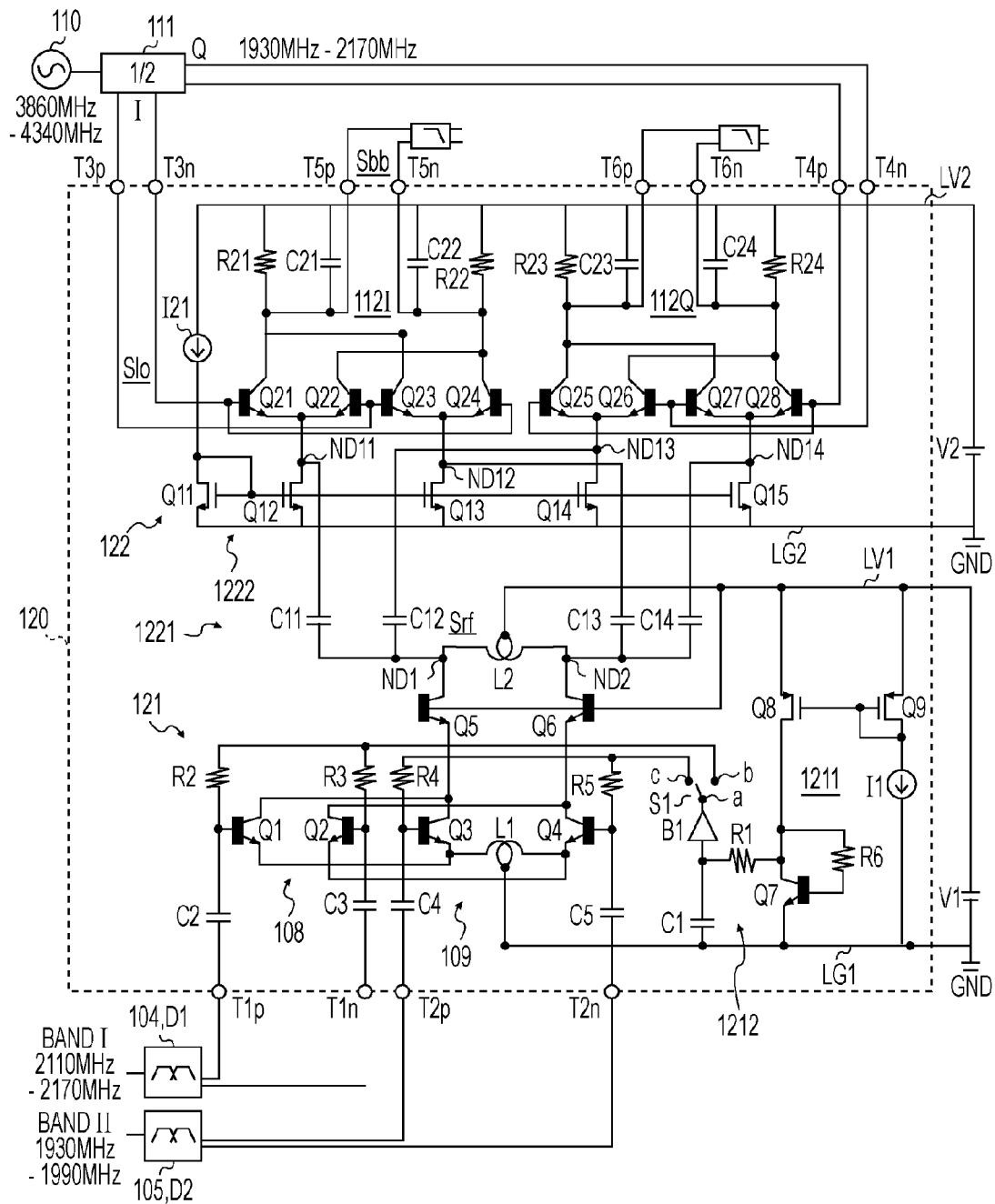
FIG. 4 is a circuit diagram illustrating an example of a specific configuration of a receiving circuit in FIG. 3.

FIG. 3 is a diagram illustrating an example of a configuration of a radio communication apparatus according to an embodiment of the present invention. Also, FIG. 4 is a circuit diagram illustrating an example of a specific configuration of a receiving circuit in FIG. 3.

The radio communication apparatus 100 of FIG. 3 illustrates an example of a configuration of a communication apparatus including mainly a receiving system of a cellular phone using a direct conversion method.

As shown in FIG. 3, the radio communication apparatus 100 of the present embodiment has an antenna (ANT) 101, switches (SW) 102 and 103, duplexers (DUP) 104 and 105, transmission power amplifiers (PA) 106 and 107, LNAs (low-noise amplifiers) 108 and 109, a local oscillator (LO) 110, a divider (phase shifter) 111, mixers (MIX) 112I and 112Q, low-path filters (LPF) 113I and 113Q, and a baseband circuit 114.

The LNAs 108 and 109, mixers (MIX) 112I and 112Q constitute a receiving circuit 120 in the radio communication apparatus 100.

This receiving circuit 120 is integrated into one chip.

The receiving circuit 120 basically has a plurality of (two in the example in FIG. 3) input terminals T1 and T2 corresponding to a plurality of receiving bands, input terminals T3 and T4 of local oscillation signals SloI and SloQ having a phase difference of 90 degrees, and output terminals T5 and T6 of baseband signals SbbI and SbbQ, to the LPFs 113I and 113Q, having a phase difference of 90 degrees.

The mixer and the LNA in the receiving circuit 120 of the present embodiment have a characteristic configuration as described below.

The mixers 112I and 112Q have a capacitor in the input section receiving the output of the LNA, and have a configuration which prevents secondary distortion from occurring by separating an in-phase component (I) and a quardrature component (Q) in direct current.

Also, in the bias circuit of the LNAs 108 and 109, noise of the bias signal from the current source is reduced by the LPF, and thus the LNA is configured to have little NF (Noise Figure) deterioration at large input signal time.

The LNAs 108 and 109 have an input section with a differential configuration having two inputs or more, and a degeneration differential inductor at emitter (source) section, whose middle point is grounded, and have cascode-connected transistors and a load inductor in common.

In the present embodiment, these circuits are implemented in an IC, and it becomes unnecessary to have a SAW filter, which has been necessary between the LNA and the mixer (MXER). Also, it is possible to achieve a direct conversion receiver for communication or broadcasting, which has a characteristic of not increasing the number of parts in the case of having a multiband capability.

In the receiving circuit 120 of the present embodiment, which has such a characteristic, a filter circuit is not necessary between the LNA and the mixer. Thus, by providing the IC with individual LNA input terminals in accordance with a frequency band, it is possible to receive a plurality of frequency bands without increasing external filter parts.

For a specific configuration of the receiving circuit 120, a detailed description will be given below in relation to FIG. 4.

Here, a description will be given of two points, one point is the reason that a filter part becomes necessary between an LNA and a mixer, and the other point is the performance of a circuit which does not need a filter.

One of the characteristics of the third-generation cellular phone using the WCDMA method is the point that a transmission signal can be output simultaneously with a receiving operation.

The transmission signal is amplified by a PA (Power Amplifier), and is supplied to an antenna through a filter circuit and switch circuit called a duplexer.

Also, a signal transmitted from a base station and received by the antenna is supplied to a LNA through the duplexer. The level of the transmission signal input into the duplexer is as high as +20 dBm, and thus the isolation (a signal leakage from the input terminal of the transmission signal to the output terminal of the receiving signal) is about 50 dB. Accordingly, a transmission signal of about −30 dBm is applied to the LNA input.

When this high-level transmission signal is applied to a mixer, a receiving signal, which is a weak signal, is suppressed, and it becomes difficult to correctly perform demodulation.

It is therefore necessary to dispose a filter circuit between the LNA and the mixer in order to attenuate the transmission signal so as not to cause suppression. For this purpose, a filter circuit is used.

The main reason why a strong signal causes suppression in the mixer is secondary distortion of the mixer. Accordingly, like the present embodiment, if the input section receiving the output of the LNA has a capacitor, and has a configuration which can keep the generation level of secondary distortion within a desired value by separating an in-phase component (I) and a quardrature component (Q) in direct current, it becomes possible to dispense with a filter between the LNA and the mixer.

Next, a description will be given of a specific configuration and functions of the receiving circuit 120 according to the present embodiment with reference to FIG. 4.

The receiving circuit 120 has an LNA section (low-noise amplifier section) 121 and a mixer section 122.

Also, in FIG. 4, each signal is a differential signal, and thus a mark p (positive) or n (negative) is added to terminals T1 to T6.

The LNA section 121 has transistors Q1 to Q7 constituted by npn bipolar transistors, transistors Q8 and Q9 constituted by p-channel MOS transistors, resistor elements R1 to R6, capacitors C1 to C5, a differential inductor for degeneration (in the following, called a degeneration inductor) L1, a load differential inductor (in the following, called a load inductor) L2, a buffer B1, a switch S1, and a current source I1.

The mixer section 122 has transistors Q11 to Q15 constituted by n-channel MOS transistors, transistors Q21 and Q28 constituted by npn bipolar transistors, capacitors C11 to C14, resistor elements R21 to R24, capacitors C21 to C24, and a current source I21.

Also, a power source voltage Vdd is supplied from the power sources V1 and V2 to the LNA section 121 and the mixer section 122 of the receiving circuit 120, respectively.

In the LNA section 121, the emitter of the transistor Q1 is connected to one terminal of the degeneration inductor L1 and the emitter of the transistor Q3. The collector of the transistor Q1 is connected to the emitter of the transistor Q5 and the collector of the transistor Q3. The base of the transistor Q1 is connected to one terminal of the resistor element R2, and to the input terminal T1$p$ through a DC cut capacitor C2.

The emitter of the transistor Q1 is connected to the other terminal of the degeneration inductor L1 and the emitter of the transistor Q4. The collector of the transistor Q2 is connected to the emitter of the transistor Q6 and the collector of the transistor Q4. The base of the transistor Q2 is connected to one terminal of the resistor element R3, and to the input terminal T1$n$ through a DC cut capacitor C3.

The emitter of the transistor Q3 is connected to one terminal of the degeneration inductor L1 and the emitter of the transistor Q1. The collector of the transistor Q3 is connected to the emitter of the transistor Q5 and the collector of the transistor Q1. The base of the transistor Q3 is connected to one terminal of the resistor element R4, and to the input terminal T2$pn$ through a DC cut capacitor C4.

The emitter of the transistor Q4 is connected to the other terminal of the degeneration inductor L1 and the emitter of the transistor Q2. The collector of the transistor Q4 is connected to the emitter of the transistor Q6 and the collector of the transistor Q2. The base of the transistor Q4 is connected to one terminal of the resistor element R5, and to the input terminal T2$n$ through a DC cut capacitor C5.

The collector of the transistor Q5 is connected to one terminal of the load inductor L2, and the connection point thereof forms one node, ND1, of a differential output of the LNA section 121. The collector of the transistor Q6 is connected to the other terminal of the load inductor L2, and the connection point thereof forms the other node, ND2, of the differential output of the LNA section 121.

The middle point of the degeneration inductor L1 is connected to a ground line LG1 connected to a reference voltage (for example, a ground voltage).

Also, the base of the cascode-connected transistors Q5, Q6 and the middle point of the load inductor L2 are connected to a power-source line LV1 connected to a power source V1.

The LNAs 108, 109 are constituted by the transistors Q1 to Q6, the resistor elements R2 to R5, the degeneration inductor L1, and the load inductor L2, which have such a connection relationship.

In this example, the LNAs 108, 109 use (have) the degeneration inductor L1, the load inductor L2, and the cascode-connected transistors Q5, Q6 in common.

A switch S1 has a fixed contact point a and operation contact points b and c. The fixed contact point a is connected to the output of the buffer B1, and the fixed contact point b is connected to the other terminals of the resistor elements R2 and R3, and the fixed contact point c is connected to the other terminals of the resistor elements R4 and R5.

The sources of the transistors Q8, Q9 are connected to the power-source line LV1, the drain of the transistor Q8 is connected to the collector of the transistor Q7, one terminal of the resistor element R1, and one terminal of the resistor element R6.

Individual gates of the transistors Q8 and Q9 are connected to each other. The drain of the transistor Q9 is connected to the connection point of the individual bases and the current source I1, and the current source I1 is connected to the ground line LG1.

The other terminal of the resistor element R6 is connected to the base of the transistor Q7, and the emitter of the transistor Q7 is connected to the ground line LG1.

The other terminal of the resistor element R1 is connected to the input terminal of the buffer and a first electrode of the capacitor C1, and a second electrode of the capacitor C1 is connected to the ground line LG1.

A bias circuit 1211 of the LNAs 108 and 109 of a current-mirror type is constituted by the transistors Q8 and Q9, the current source I1, the transistor Q7, and the resistor element R6, which have such a connection relationship.

Also, a LPF (low-pass filter) 1212 is constituted by the resistor element R1 and the capacitor C1.

In the mixer section 122, first electrodes of the capacitors C11 and C12 are connected to the output node ND1 of the LNA section 121, and first electrodes of the capacitors C13 and C14 are connected to the output node ND2 of the LNA section 121.

These capacitors C11 to C14 constitute an input section 122I of the mixer section 122.

The sources of the transistors Q11 to Q15 are commonly connected to a ground line (reference voltage line) LG2. The gates of the transistors Q11 to Q15 are commonly connected, the connection point of the gates thereof are connected to the drain of the transistor Q11 and a current source I21, and the current source I21 is connected to the power-source line LV2.

The collector of the transistor Q12 is connected to a second electrode of the capacitor C11 of the input section 122I, and is commonly connected to the emitters of the transistors Q21 and Q22, thereby forming a node ND11 by these connection points.

The drain of the transistor Q13 is connected to a second electrode of the capacitor C13 of the input section 122I, and is commonly connected to the emitters of the transistors Q23 and Q24, thereby forming a node ND12 by these connection points.

The drain of the transistor Q14 is connected to a second electrode of the capacitor C12 of the input section 122I, and is commonly connected to the emitters of the transistors Q25 and Q26, thereby forming a node ND13 by these connection points.

The drain of the transistor Q15 is connected to a second electrode of the capacitor C14 of the input section 122I, and is commonly connected to the emitters of the transistors Q27 and Q28, thereby forming a node ND14 by these connection points.

A current source 1222 of a current-mirror type is constituted by the transistors Q11 and Q15, and the current source I1, which have such a connection relationship.

Individual emitters of the transistors Q21 and Q22 are connected to each other, and are connected to the node ND11. The collector of the transistor Q21 is connected to an output terminal T5$n$ of a baseband signal SbbI to the LPF 113I, and the collector of the transistor Q23. Also, the collector of the transistor Q21 is connected to the power-source line LV2 through the resistor element R21 and the capacitor C21, which are disposed in parallel.

Individual emitters of the transistors Q23 and Q24 are connected to each other, and are connected to the node ND12. The collector of the transistor Q24 is connected to an output terminal T5$n$ of a baseband signal SbbI to the LPF 113I, and the collector of the transistor Q22. Also, the collector of the transistor Q24 is connected to the power-source line LV2 through the resistor element R22 and the capacitor C22, which are disposed in parallel.

The bases of the transistors Q21 and Q24 are connected to an input terminal T3$n$ of the local oscillation signal SloI, and the bases of the transistors Q22 and Q23 are connected to an input terminal T3p of the local oscillation signal SloI.

An I-side mixer 112I is constituted by the transistors Q21 to Q24, the resistor elements R21 and R22, the capacitors C21 and C22, the transistors Q11 to Q13, and the current source I21, which have such a connection relationship.

Individual emitters of the transistors Q25 and Q26 are connected to each other, and are connected to the node ND 13. The collector of the transistor Q25 is connected to an output terminal T6p of a baseband signal SbbQ to the LPF 113Q, and the collector of the transistor Q27. Also, the collector of the transistor Q25 is connected to the power-source line LV2 through the resistor element R23 and the capacitor C23, which are disposed in parallel.

Individual emitters of the transistors Q27 and Q28 are connected to each other, and are connected to the node ND14. The collector of the transistor Q28 is connected to an output terminal T6n of a baseband signal SbbQ to the LPF 113Q, and the collector of the transistor Q26. Also, the collector of the transistor Q28 is connected to the power-source line LV2 through the resistor element R24 and the capacitor C24, which are disposed in parallel.

The bases of the transistors Q25 and Q28 are connected to an input terminal T4p of the local oscillation signal SloQ, and the bases of the transistors Q26 and Q27 are connected to an input terminal T4n of the local oscillation signal SloQ.

An Q-side mixer 112Q is constituted by the transistors Q25 to Q28, the resistor elements R23 and R24, the capacitors C23 and C24, the transistors Q11, Q14, and Q15, and the current source I21, which have such a connection relationship.

Next, a description will be given of the operation of the receiving system of the radio communication apparatus having the configuration of FIGS. 3 and 4.

In principle, as shown in FIG. 3, in the radio communication apparatus 100, an RF signal received by the antenna 101 passes through the switches 102 and 103 and the duplexers 104 and 105, and is input into the LNAs 108 and 109 of the receiving circuit 120 included in an IC.

The switch S1 is switched in accordance with the receiving frequency by a control system not shown in the figure, an amplified signal Srf either by the LNA 108 or the LNA 109 is multiplied by the local oscillation signals SloI and SloQ by the mixers 112I and 112Q, respectively, and the signals are converted into the baseband signals SbbI and SbbQ, respectively.

Here, the local oscillation signals SloI and SloQ are obtained by dividing the oscillation signal of the local oscillator 110 into signals having ½ the original frequency, and the signals applied to the input terminals T3 and T4 have a phase difference of 90 degrees, thus constituting a quadrature mixer by the mixer 112I and the mixer 112Q.

Accordingly, the baseband signals SbbI and SbbQ having a phase difference of 90 degrees can be obtained at the output terminals T5 and T6, respectively.

More specifically, in the receiving circuit 120, the LNA 108 includes differential input transistors Q1 and Q2, the degeneration inductor L1, the cascode-connected transistors Q5 and Q6, and the load inductor L2.

By employing a cascode connection in this manner, it is possible to restrain the influence of so-called mirror effect.

The LNA 109 receives input at the bases of the differential transistors Q3 and Q4 uses the degeneration inductor L1, the cascode-connected transistors Q5 and Q6, and the load inductor L2 by sharing the same circuit with the LNA 108.

As shown in FIG. 4, individual duplexers 104 and 105 corresponding to the receiving frequencies are connected to the bases of the differential transistors Q1 and Q2, and the transistors Q3 and Q4, which constitute both input sections, through the DC cutting capacitors C2 and C3, and capacitors C4 and C5.

In the example in FIG. 4, the duplexer 104 is for the band I, and duplexer 105 is for the band II.

The bias circuit 1211 of the LNAs 108 and 109 is constituted by the current source I1, the transistors Q8, Q9, and Q7, and the resistor element R6, which constitute a current-mirror. The LNA section 121 further includes the LPF 1212 including the resistor element R1 and the capacitor C1 for attenuating noise generated from the bias circuit (regulator circuit) 1211, and the buffer B1.

Either the LNA 108 or the LNA 109 is biased by the position of the switch S1 by the bias circuit 1211. The switch is controlled, for example, such that the fixed contact point a and the operation contact point b are connected by a switching signal from a control system not shown in the figure in the case of the band I. Also, in the case of the band II, the switch is controlled such that the fixed contact point a and the operation contact point c are connected by the switching signal from the control system not shown in the figure.

A self-transmitting signal of about −30 dBm is input to the LNA 108 and the LNA 109 as a blocking signal.

The input of such a large input signal increases noise, in the receiving frequency band, occurred from the current regulator circuit of the bias circuit 1211, deteriorating the NF in the receiving frequency band of the LNA 108 and the LNA 109.

In the present embodiment, by inserting the LPF 1212 between the regulator and the buffer B1, noise from the current regulator is prevented, and the deterioration of the NF in the receiving frequency band is prevented.

Also, the bases of the differential input transistors Q1 and Q2, or the transistors Q3 and Q4 are biased through the bias circuit 1211, the LPF 1212, the buffer B1, and the switch S1. In this case, for example, 0.8 V is applied to the bases, and the connection side of the resistor elements R2 and R3, and the resistor elements R4 and R5 with the switch S1 becomes about 0.9 V.

In response to this, 0.8 V is also applied to the base of the transistor Q7 of the bias circuit 1211, and the potential of the connection point between the resistor element R6 and the collector of the transistor Q7 becomes 0.9 V.

That is to say, it becomes possible to apply more stable and correct bias by providing the bias circuit 1211 with the configuration to go into a substantially equivalent state to the bias state of the LNA 108 or the LNA 109 to be actually amplified.

The signal that has been subjected to the amplification operation by the LNA 108 or the LNA 109 is output from the nodes ND1 and ND2 to the mixer section 122.

The signal that has been amplified by the LNA 108 or the LNA 109 in the mixer section 122 passes through the capacitors C11, C12, C13, and C14, and is input to the mixers 112I and 112Q of grounded-emitter transistors Q21 to Q24, and Q25 to Q28.

The signal that has passed through the capacitor C11 is supplied to the transistor Q21 connected to the node ND11 and the emitter of the transistor Q22. The signal that has passed through the capacitor C12 is supplied to the transistor Q25 connected to the node ND13 and the emitter of the transistor Q26. The signal that has passed through the capacitor C13 is supplied to the transistor Q23 connected to the node ND12 and the emitter of the transistor Q24. The signal that has passed through the capacitor C14 is supplied to the transistor Q27 connected to the node ND14 and the emitter of the transistor Q28.

By inputting an RF signal from the emitter side of a mixer constituted by a so-called Gilbert cell mixer, the mixer having a small inter-modulation distortion is achieved.

In the mixer section 122 of the present embodiment, the coupling, together with DC cut, of the emitters of the I-side mixer 112I and the Q-side mixer 112Q with the LNA output is carried out by individual capacitors (capacitance).

The main cause of the secondary distortion that occurs in the mixers 112I and 112Q is the voltage offset between the base and emitter (BE) of the pair of transistors of the Gilbert cell mixer.

Like the present embodiment, by capacity coupling of the emitters, it is possible to prevent an increase in the secondary distortion by the direct-current voltage offset impacting from the I-side to the Q-side or from the Q-side to the I-side.

As described above, in the present embodiment, in the LNA section 121 of the receiving circuit 120, individual duplexers 104 and 105 corresponding to the receiving frequencies are connected to the bases of the differential transistors Q1 and Q2, and transistors Q3 and Q4, which constitute both input sections of the LNAs 108 and 109 through the DC cutting capacitors C2 and C3, and capacitors C4 and C5. The LNA 108 and the LNA 109 share the degeneration inductor L1, the cascode-connected transistors Q5 and Q6, and the load inductor L2. The bias circuit 1211 of the LNAs 108 and 109 is constituted by the current source I1, the transistors Q8, Q9 and Q7, and the resistor element R6, which constitute a current-mirror. The LNA section 121 further includes the LPF 1212 including the resistor element R1 and the capacitor C1 for attenuating noise generated from the bias circuit 1211.

The signal that has been amplified by the LNA 108 or the LNA 109 in the mixer section 122 passes through the capacitors C11, C12, C13, and C14, and is input to the mixers 112I and 112Q of grounded-emitter transistors Q21 to Q24, and Q25 to Q28.

Thus, according to the present embodiment, in the mixer section 122, by capacity coupling of the emitters, it is possible to prevent an increase in the secondary distortion by the direct-current voltage offset impacting from the I-side to the Q-side or from the Q-side to the I-side. Also, in the LNA section 121, it is possible to prevent noise generated from the current regulator, and to prevent the deterioration of the NF in the receiving frequency band by inserting the LPF 1212 between the bias circuit (regulator) and the buffer B1.

As a result, it is possible to dispense with filter parts disposed between the LNA and the mixer, and to prevent an increase in the number of parts in the case of having a multiband capability, to be miniaturized, and to achieve receiving processing with high precision.

Also, the following advantages are obtained in sharing the degeneration inductor L1, the cascode-connected transistors Q5 and Q6 in the output section, and the load inductor L2 by the LNAs 108 and 109.

An inductor occupies an extremely larger area compared to a transistor in an IC, and it is difficult to reduce the size thereof by semiconductor miniaturization. Accordingly, the benefit of sharing the degeneration inductor and the load inductor by a plurality of LNAs is great, and thus there is a great benefit in the miniaturization of the receiving circuit of a cellular phone, which is requested to have a multiband capability.

Also, it is not necessary to dispose a filter between the LNA and the mixer, and thus there is no need to increase the number of external parts. It is therefore possible to have a multiband capability, to reduce cost, and to achieve miniaturization.

Accordingly, a radio communication apparatus according to the present embodiment can be applied not only to a third-generation cellular phone, but also to a direct-conversion receiving circuit for broadcasting. Thus, the radio communication apparatus advantageously has a broad range of applications.

In this regard, the receiving circuit of FIG. 4 has a configuration including a bipolar transistor and a field-effect transistor (MOS transistor). However, the receiving circuit is not limited to this configuration.

Figure 5:
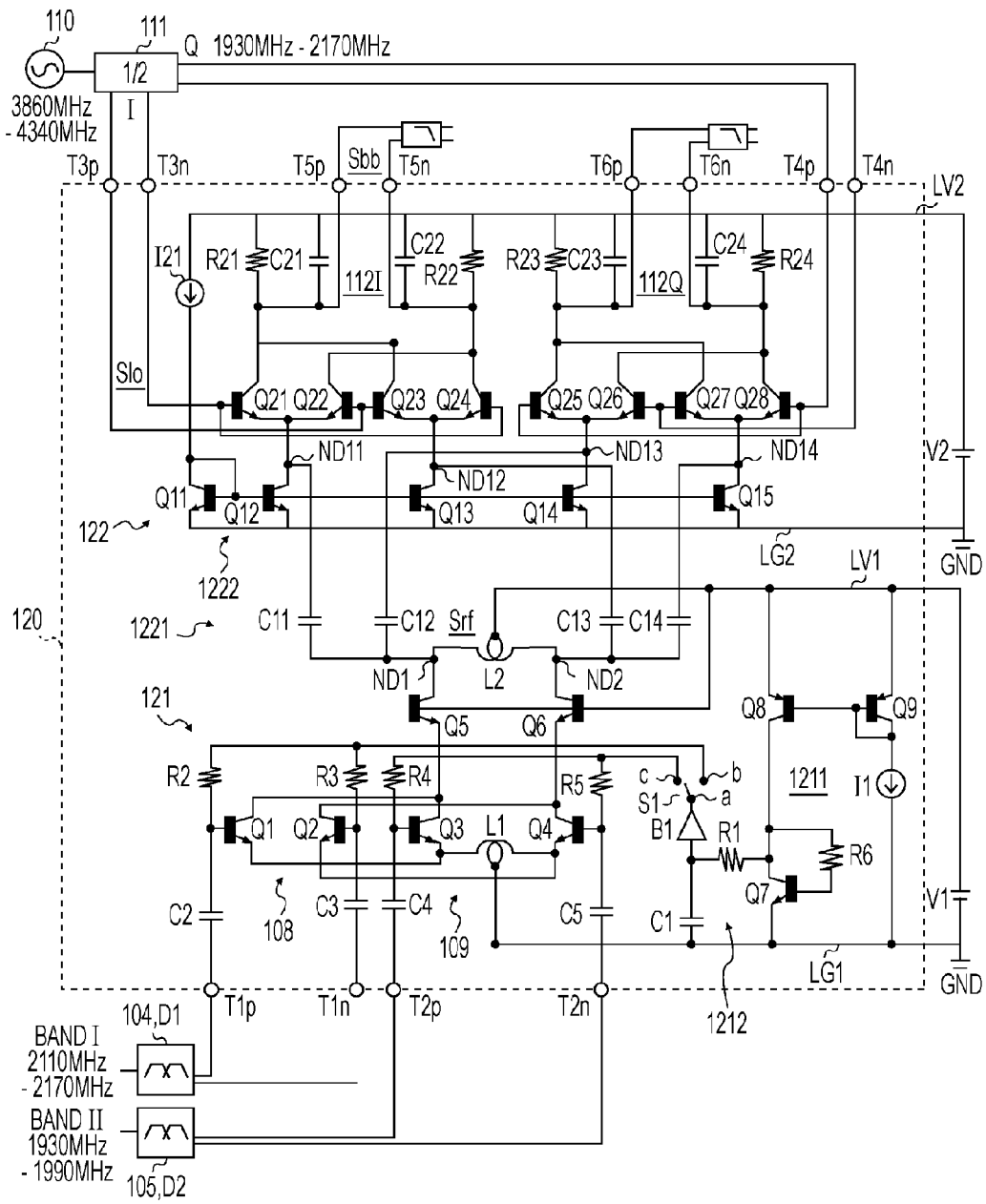
FIG. 5 is a circuit diagram illustrating another example of a specific configuration of the receiving circuit in FIG. 3.

For example, as shown in FIG. 5, instead of constituting the transistors Q8, Q9, and Q11 to Q15 by field-effect transistors, it is possible to constitute them by bipolar transistors.

In this case, the transistors Q8 and Q9 can be formed by pnp bipolar transistors, and the transistors Q11 to Q15 can be formed by npn bipolar transistors.

Figure 6:
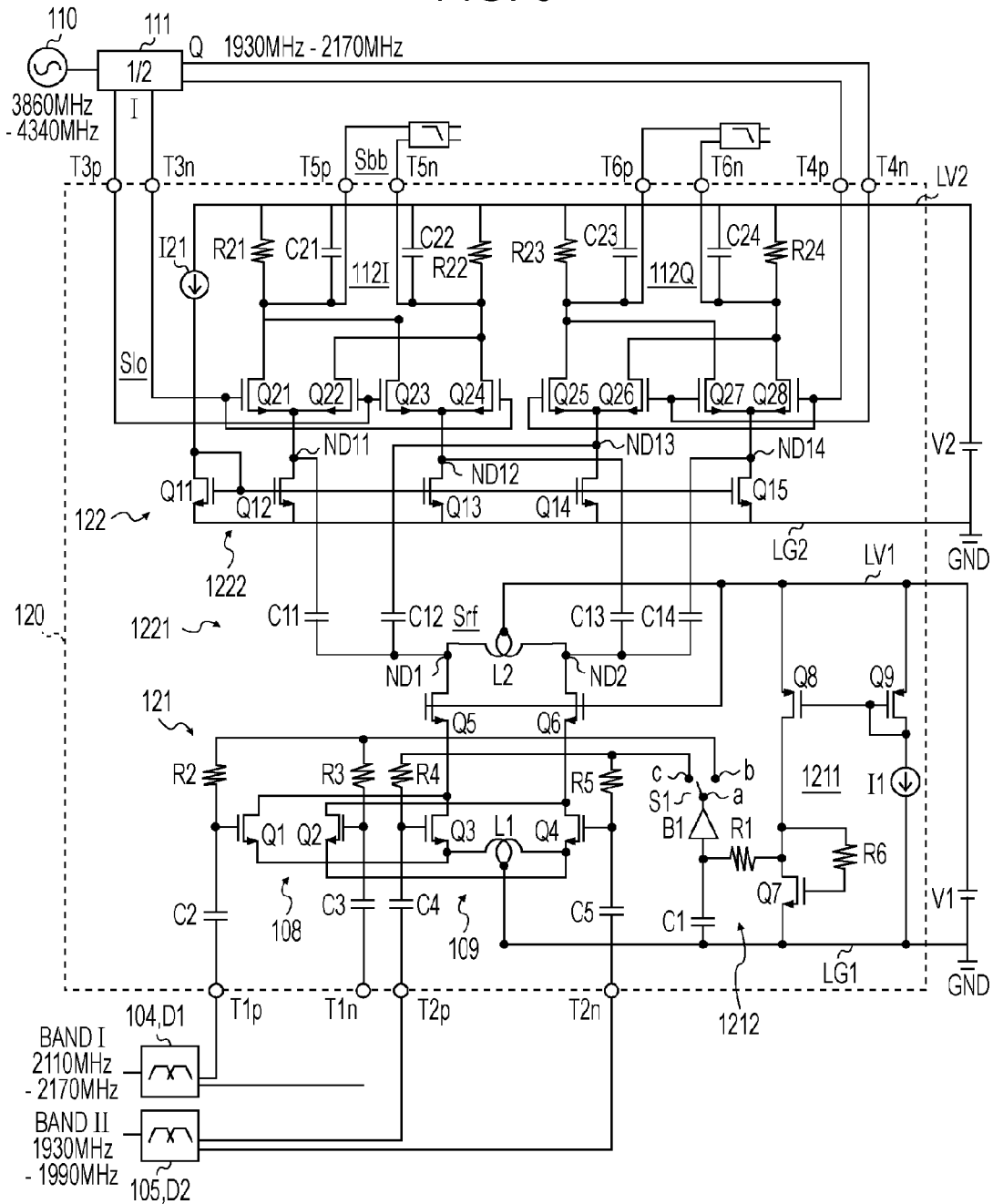
FIG. 6 is a circuit diagram illustrating still another example of a specific configuration of the receiving circuit in FIG. 3.

Also, as shown in FIG. 6, instead of constituting the transistors Q1 to Q7 and Q21 to Q26 by bipolar transistors, it is possible to constitute them by field-effect transistors.

In this case, the transistors Q1 to Q7 and Q21 to Q26 can be formed by n-channel MOS transistors.

Also, the number of signal inputs of the receiving circuit is not limited to two, and it is possible to have three inputs or more.

In this case, LNAs corresponding to the number of signal inputs are provided, and the number of operation contact points of the switch S1 is set in accordance with the number of inputs.

It should be understood by those skilled in the art that various modifications, combinations, sub-combinations and alterations may occur depending on design requirements and other factors insofar as they are within the scope of the appended claims or the equivalents thereof.

What is claimed is:

1. A radio communication apparatus using a direct conversion method and capable of receiving a radio signal having a predetermined frequency band, the radio communication apparatus comprising:
    a low-noise amplifier section including one or more low-noise amplifiers receiving a receiving signal having a predetermined frequency band; and
    a mixer section including in-phase and quadrature mixers to demodulate an output of the low-noise amplifier section into in-phase-component and quadrature-component signals, respectively,
    wherein,
        the mixer section includes an input section having a capacitor, the input section configured to (a) receive the output of the low-noise amplifier section, (b) separate the in-phase component and the quadrature component in the direct current, and (c) supply the components to the corresponding in-phase and quadrature mixers, respectively.

2. The radio communication apparatus according to claim 1, wherein the low-noise amplifier section includes:
    a bias circuit configured to generate a bias signal to bias a signal-input terminal of the low-noise amplifier section; and
    a filter configured to reduce noise of an output signal of the bias circuit and supply a resulting signal to the signal-input terminal.

3. A radio communication apparatus using a direct conversion method and capable of receiving a radio signal having a predetermined frequency band, the radio communication apparatus comprising:
    a low-noise amplifier section including one or more low-noise amplifiers receiving a receiving signal having a predetermined frequency band; and a mixer section including in-phase and quadrature mixers to demodulate an output of the low-noise amplifier section into in-phase-component and quadrature-component signals, respectively, wherein, the mixer section includes an input section having a capacitor, the input section configured to (a) receive the output of the low-noise amplifier section, (b) separate the in-phase component and the quadrature component in the direct current, and (c) supply the components to the corresponding in-phase and quadrature mixers, respectively, each of the plurality of low-noise amplifiers is formed by a differential pair of transistors, and each of the differential pairs of transistors has a differential inductor for degeneration in common at a reference potential side.

4. A radio communication apparatus using a direct conversion method and capable of receiving a radio signal having a predetermined frequency band, the radio communication apparatus comprising:

a low-noise amplifier section including one or more low-noise amplifiers receiving a receiving signal having a predetermined frequency band; and a mixer section including in-phase and quadrature mixers to demodulate an output of the low-noise amplifier section into in-phase-component and quadrature-component signals, respectively, wherein, the mixer section includes an input section having a capacitor, the input section configured to (a) receive the output of the low-noise amplifier section, (b) separate the in-phase component and the quadrature component in the direct current, and (c) supply the components to the corresponding in-phase and quadrature mixers, respectively, each of the plurality of low-noise amplifiers is formed by a differential pair of transistors, and each of the differential pairs of transistors has cascode-connected transistors and a load inductor in common at an output side.

5. A radio communication apparatus using a direct conversion method and capable of receiving a radio signal having a predetermined frequency band, the radio communication apparatus comprising:

a low-noise amplifier section including one or more low-noise amplifiers receiving a receiving signal having a predetermined frequency band; and a mixer section including in-phase and quadrature mixers to demodulate an output of the low-noise amplifier section into in-phase-component and quadrature-component signals, respectively, wherein, the mixer section includes an input section having a capacitor, the input section configured to (a) receive the output of the low-noise amplifier section, (b) separate the in-phase component and the quadrature component in the direct current, and (c) supply the components to the corresponding in-phase and quadrature mixers, respectively, and each of the plurality of low-noise amplifiers is formed by a differential pair of transistors, each of the differential pairs of transistors has a differential inductor for degeneration in common at a reference potential side, and cascode-connected transistors and a load inductor in common at an output side.

6. A radio communication apparatus using a direct conversion method and capable of receiving a radio signal having a predetermined frequency band, the radio communication apparatus comprising:

a low-noise amplifier section including one or more low-noise amplifiers receiving a receiving signal having a predetermined frequency band; and a mixer section including in-phase and quadrature mixers to demodulate an output of the low-noise amplifier section into in-phase-component and quadrature-component signals, respectively, wherein, the mixer section includes an input section having a capacitor, the input section configured to (a) receive the output of the low-noise amplifier section, (b) separate the in-phase component and the quadrature component in the direct current, and (c) supply the components to the corresponding in-phase and quadrature mixers, respectively, each of the plurality of low-noise amplifiers is formed by a differential pair of transistors, each of the differential pairs of transistors has a differential inductor for degeneration in common at a reference potential side, and cascode-connected transistors and a load inductor in common at an output side, and the low-noise amplifier section has a switch to selectively supply the bias signal through the filter as input to the low-noise amplifier corresponding to input of the frequency signal in response to a receiving frequency.

7. The radio communication apparatus according to claim 1, wherein:

the in-phase and quadrature mixers are individually formed by a Gilbert cell mixer including a differential pair of transistors, and the input section of the mixer section is configured to supply an output signal of the low-noise amplifier section to a differential connection section of the transistors of the corresponding cell through a capacitor coupling.

8. The radio communication apparatus according to claim 6, wherein:

the in-phase and quadrature mixers are individually formed by a Gilbert cell mixer including a differential pair of transistors, and the input section of the mixer section is configured to supply an output signal of the low-noise amplifier section to a differential connection section of the transistors of the corresponding cell through a capacitor coupling.

* * * * *